June 13, 1967 F. R. THOMPSON 3,325,142
VALVE WITH RESILIENT SEAT AND RETAINER
Filed May 13, 1964

INVENTOR
FRANK RANDOLPH THOMPSON
BY Dodge and Son
ATTORNEYS 3,325,142
VALVE WITH RESILIENT SEAT AND
RETAINER
Frank R. Thompson, Cranston, R.I., assignor to The New
York Air Brake Company, a corporation of New Jersey
Filed May 13, 1964, Ser. No. 366,975
2 Claims. (Cl. 251—306)

This invention relates to valves. Specifically, it relates to an improved seat construction for butterfly valves.

Butterfly valves include a seat commonly consisting of an encircling annulus of elastomeric material which engages the periphery of the valve disc. Easy mounting and removal of this seat for replacement is an important consideration.

The present invention relates to seat assembly which is effectively retained after mounting and which consists of but three parts, namely: a seat member and a two-piece retainer therefor. The seat is mounted in an undercut groove formed in the valve housing having a trapezoidal section. The seat has a similar section but shorter bases than those of the groove. The retainer comprises two substantially semi-circular parts, each having a parallelogrammatic section. Each retainer lies in the groove in the valve alongside the seat and fills the remaining part of the grove. The parts are bonded together and to the valve body. This bond can be achieved by use of an adhesive composition or by vulcanizing the elastomeric seat and retainer while in place. This seat construction is relatively inexpensive, yet easy to install and reliable in service.

The preferred embodiment of the invention is described herein in detail with references to the accompanying drawing in which.

Figure 1:
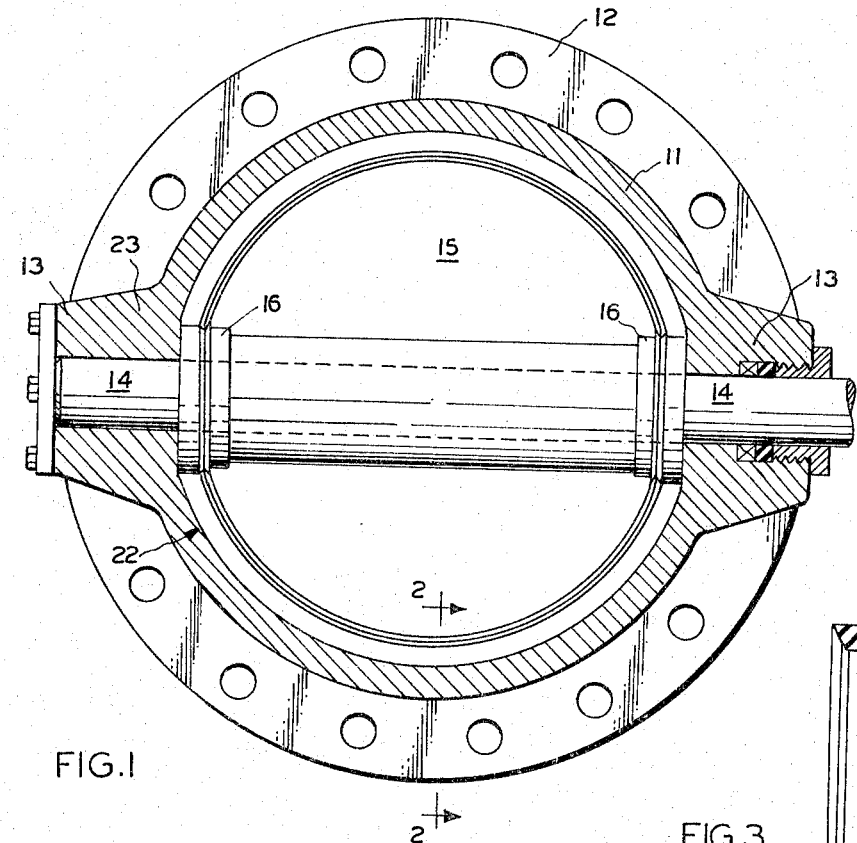
FIG. 1 is a sectional view taken on the transverse plane passing through the axis of rotation of the valve disc.

As shown in the drawings, the valve comprises a circular, cylindrical housing 11 having bolting flanges 12 at its opposite ends. A pair of journals 13 extend laterally from opposite sides of the housing 11 and receive valve shaft trunnions 14 connected to the valve disc 15 by appropriate means (not shown). As shown, the disc is provided at opposite ends of its axis of rotation with enlarged hubs 16 having outer end sealing faces. The outer cylindrical peripheral surface 17 of the valve disc 15 is provided with a central circumferential rib 18.

Figure 3:
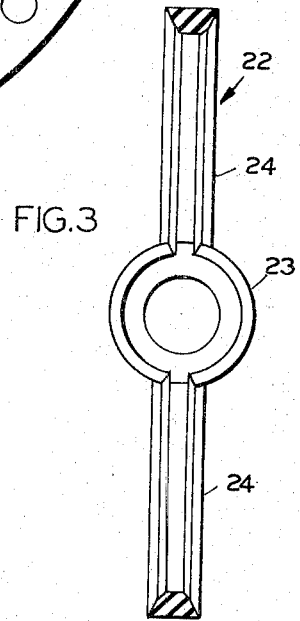
FIG. 3 is a detailed axial section of the valve seat member.

The housing 11 is provided with counterbored recesses adjacent each of the enlarged hubs 16. These recesses encircle trunnions 14. A groove 21 is formed in the inner cylindrical surface of the housing 11. This groove is provided with a trapezoidal cross-section, preferably the trapezoid is isosceles. The groove 21 has two parts each of which extends between the diametrically opposite recesses (see FIG. 1), but in different side walls. Seated in the groove 21 and the recesses is a valve seat member 22 whose form is best shown in FIG. 3.

Figure 2:
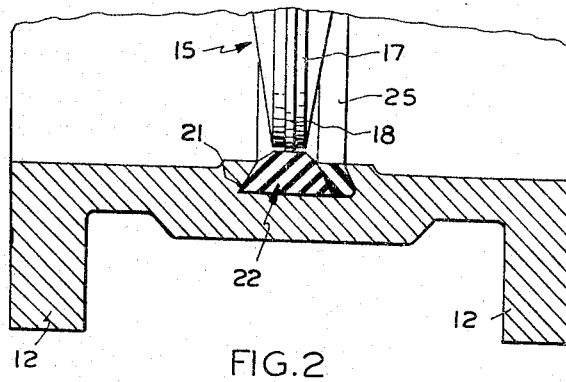
FIG. 2 is a fragmentary axial section approximately on he line 2–2 of FIG. 1.

The seat 22 comprises two annular portions 23, each of which is received in the corresponding one of the recesses. The portions 23 are connected by the substantially semi-circular portions 24. Each of these semi-circular portions has a trapezoidal section. Preferably the trapezoid is isosceles. The large base of this trapezoid is shorter than the large base of the trapezoidal section of the groove 21 (see particularly, FIG. 2). The corresponding base angles of the two trapezoids, i.e., the section of the groove 21 and the seat 22, are equal. A retainer 25 having a parallelogrammatic section is also disposed in the groove 21 and fills the interval between the groove and the seat 22. The retainer 25 has a thickness, measured in a direction parallel with the base of the seat 22, equal to not materially less than the difference between the length of the large and small bases of the trapezoidal section of the seat 22. This permits the seat to be put in place with little or no distortion. The engaging side faces of the valve seat 22 and the retainer 25 are bonded to one another and the valve seat 22 and the retainer 25 are similarly bonded to the side faces and the base of the groove 21. The bonding agent may, for example, be an epoxy cement. The bonding may also result from vulcanization of the parts in place.

The retainer 25 and the valve seat 22 are made of elastomeric material and the retainer has a Durometer hardness higher than that of the valve seat 22. The Durometer hardness of the seat is approximately between 50 and 55 while the hardness of the retainer is approximately between 70 and 80. The base angles of the trapezoid in the illustrated embodiment are 60°. Base angles between 45° and 75° will be suitable. If the base angles are greater than 75°, the retention provided by the undercut will not be adequate in all types of service. If angles smaller than 45° are used, the retainer 25 becomes undersirably thick and the seating surface of the valve seat becomes too narrow. The seat material and the retainer material must be selected in accordance with the service for which the valve is intended. The fluid which is controlled by the valve must not cause deterioration of the elastomer selected. Vulcanized natural rubbers would be suitable in some installations, for example, water; neoprene may be used where hydrocarbons are handled; and other synthetic rubbers and similar materials may be used in other installations. Regardless of what material is selected, the seat should be somewhat more deformable than the retainer 25 so that it will flow to conform to and seat against the rib 18 on the valve disc. It will be apparent that the retainer 25 must be made in two pieces. It does not have a portion which extends around or encircles the trunnions 14.

It will be apparent to those skilled in the art that the inventive concept is not limited to the preferred embodiment illustrated and described. No limitation to this embodiment is intended except as is implicit in the appended claims.

What I claim is:

1. In a butterfly valve of the type including a housing having a circular cylindrical flow passage therethrough and a generally circular valve disc; a pair of trunnions extending diametrically from said disc and journalled in said housing; the improvement comprising cylindrical recesses formed in the housing, one encircling each trunnion; two grooves formed in said housing and extending circumferentially between said recesses and encircling the flow path, said grooves having a trapezoidal section, each of the base angles of the trapezoid being between 45° and 75°; a one-piece resilient, rubber-like sealing member in said recesses and said grooves, the portions lying in said grooves having a trapezoidal section, the inner circumferential surface of the member being engaged by the periphery of the disc when the valve is closed; a flexible retainer means in each of said grooves having a parallelogrammatic section and lying alongside each of said portions whereby each groove is filled; and means bonding the sealing member, the retainer means and the walls of the corresponding grooves to each other.

2. The combination defined in claim 1 and a hub on the valve disc adjacent each trunnion and each having a sealing face in sealing engagement with the portion of the sealing member which lies in the corresponding recess.

References Cited

UNITED STATES PATENTS

| | | | |
|---|---|---|---|
| 2,991,043 | 7/1961 | Saar | 251—306 |
| 3,063,672 | 11/1962 | Nichols | 251—306 |
| 3,105,672 | 10/1963 | Kinney et al. | 251—306 |

FOREIGN PATENTS

| | | |
|---|---|---|
| 948,379 | 8/1956 | Germany. |

M. CARY NELSON, *Primary Examiner.*

A. ROSENTHAL, *Assistant Examiner.*